(12) United States Patent
Klein

(10) Patent No.: US 7,600,355 B1
(45) Date of Patent: Oct. 13, 2009

(54) UNITARY MOLDED CORNER PIECE METHOD AND APPARATUS

(76) Inventor: Robert D. Klein, 1152 Manchester Rd., Belgrade, ME (US) 04917

( * ) Notice: Subject to any disclaimer, the term of this patent is extended or adjusted under 35 U.S.C. 154(b) by 0 days.

(21) Appl. No.: 11/654,055

(22) Filed: Jan. 16, 2007

Related U.S. Application Data

(60) Provisional application No. 60/761,694, filed on Jan. 23, 2006.

(51) Int. Cl.
*E06B 1/04* (2006.01)
*E04C 2/38* (2006.01)
*E06B 3/984* (2006.01)

(52) U.S. Cl. ............ 52/656.9; 52/656.1; 52/288.1; 52/217; 403/401; 403/402; 403/403

(58) Field of Classification Search .......... 52/656.1, 52/656.5, 656.9, 288.1, 287.1, 211, 278, 52/716.8, 217; 403/401, 403, 405.1, 295, 403/341
See application file for complete search history.

(56) References Cited

U.S. PATENT DOCUMENTS

| | | | | |
|---|---|---|---|---|
| 2,861,659 A | * | 11/1958 | Hagerty et al. ............ 403/231 |
| 4,608,800 A | * | 9/1986 | Fredette ................... 52/656.1 |
| 4,862,612 A | * | 9/1989 | Sugihara et al. ............ 40/782 |
| 5,625,992 A | * | 5/1997 | Strick et al. ............... 52/656.9 |
| D383,856 S | * | 9/1997 | Howell ..................... D25/102 |
| 5,711,120 A | * | 1/1998 | Karpen ...................... 52/212 |
| 5,924,259 A | * | 7/1999 | Marousek .................. 52/656.1 |
| 6,047,507 A | * | 4/2000 | Lappin et al. .............. 52/212 |
| 6,073,412 A | * | 6/2000 | Verch ...................... 52/656.5 |
| 6,108,997 A | * | 8/2000 | Blais et al. ............... 52/656.7 |
| 6,253,507 B1 | * | 7/2001 | Martino ..................... 52/211 |
| 6,457,287 B1 | * | 10/2002 | Wilcox ..................... 52/217 |
| 6,725,610 B2 | * | 4/2004 | Murphy et al. ............... 52/58 |
| 7,146,774 B2 | * | 12/2006 | Fredette ................... 52/656.6 |
| 2003/0200712 A1 | * | 10/2003 | Brownsell et al. ......... 52/287.1 |

* cited by examiner

*Primary Examiner*—Richard E Chilcot, Jr.
*Assistant Examiner*—Mark R Wendell
(74) *Attorney, Agent, or Firm*—Stan Jones Patents

(57) ABSTRACT

A unitary molded corner piece, shaped as a right angle V, has a grooved base with slide openings on adjacent sides of the base for receiving and joining together a pair of orthogonally oriented J channel pieces in an assembly. Right angles of the unitary corner piece are spaced apart and defined by spaced vertical walls shaped as an inner and outer angle. Such angles are joined together at the top of the vertical walls by a closed loop. Two orthogonal oriented J channels slide into the corner base while a J channel vertical wall and a J channel top piece slide within the space defined between the vertical walls of the right angle V of the corner piece. A loose free end of the J channel fits within the adjoining loop of the corner piece. Reinforcing ribs in a J channel receiving pocket both frictionally hold a J channel inserted into said corner piece and guide water as a trough.

12 Claims, 3 Drawing Sheets

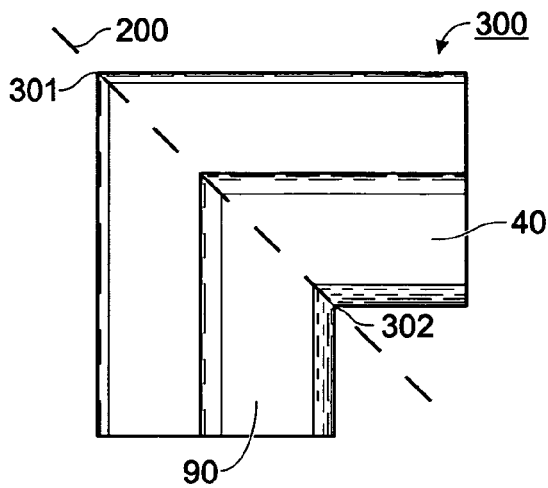
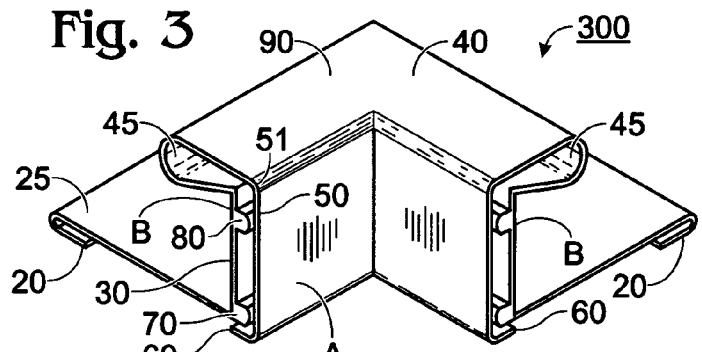
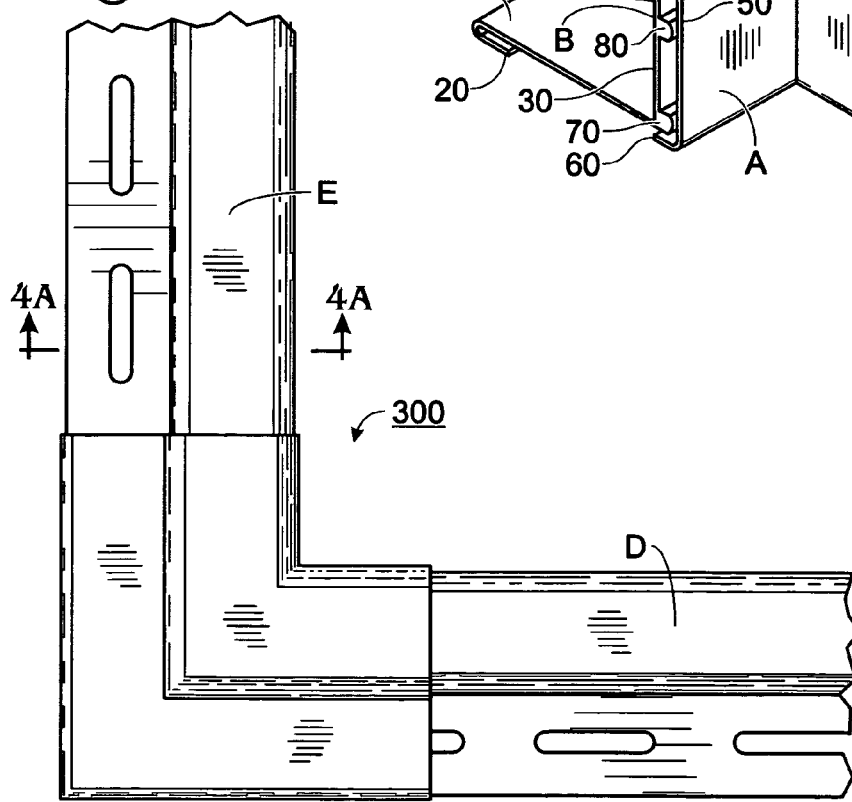

UNITARY MOLDED CORNER PIECE METHOD AND APPARATUS

PREVIOUS FILING INFORMATION

This is an original filing of a regular utility patent application. The contents and filing date of a Provisional Application No. 60/761,694 filed on Jan. 23, 2006 by the same inventor hereof and having confirmation No. 3332 is mandated. Priority of that Provisional Application is claimed, and the contents and benefits thereof are incorporated herein by reference, as though that Provisional Application were set forth in full at this point.

BACKGROUND OF THE INVENTION

This invention is made by a sole inventor without any sponsorship of government funds.

Field of the Invention

This field of the invention relates generally to construction and the building trades; and, more particularly, to the field of forming window surrounds using vinyl J channel molding strips. This corner invention is identified by an adopted name and design of Kwik Corner™. My web site, of the same name, describes some features, advantages and protection afforded both by my coined name, Trademark and my patent pending invention.

The invention claimed herein finds particular application in contractor use and the building boom of today. Vinyl siding is prevalent today. Such siding makes ample use of J channel window surrounds. This Kwik Corner invention provides both a method and an apparatus of improved design and novel structural components as well.

The invention provides an improved construction step and savings for the building trades industry. In short, this invention teaches that many of the directionally oriented corner pieces of the prior art pointed in the wrong direction. The new molded corner piece itself—together with the method steps of its use—provides non obvious features well advanced over the known prior art.

EXPLANATION OF TERMS

Set out below are brief descriptions of certain relevant terms which further the understanding of the invention. These terms provide a basis for a detailed teaching of the improvements of this invention in the relevant arts. Such terms are not intended to replace the claims but rather serve as helpful guides in understanding my novel improvements in these arts.

J Channel Molding

The J channel is so named because it is shaped in cross section as a J and has a flange for nailing the channel to the structure being fabricated. A visible upper surface of the molding has a width that is grooved with a textured surface which blends with the vinyl siding being used in home and office construction. The J channel is inserted in the corner piece of the invention without regard to direction being demanded for each corner. This corner invention does not require an additional flange for nailing, since it relies upon the J channel nailing for securing the corner piece of the invention to the structure.

J Channel Receiving Pocket

Spaced walls, top and bottom tabs and a closed adjoining loop together form an opening in the orthogonally oriented sides of a molded corner piece. This opening is slightly larger than the cross section of a standard J channel and is referred to herein as a J channel receiving pocket. The vertical walls support ribs that tend to fill the pocket space, which ribs frictionally engage a J channel inserted into the pocket. The free end of a J channel is held by the closed loop and it together with the ribs frictionally connect J channel strips inserted by a user into the J channel receiving pocket.

Corner Piece Water Trough

The invention comprises a molded corner that has a closed loop at its upper surface which joins together a pair of spaced vertical wall sections of two molded corner pieces (inner and outer) formed together as a unitary element. The function of the J channel is to funnel and guide water away from the window and the vinyl siding under surface. The corner piece invention has a pair of upstanding reinforcing ribs that perform the added functions of creating water guides which steer water around the corner. This stated structure, at the same time, supplies a gripping function against the J channel molding strips which are placed into receiving grooves formed by the looped corner and the spaced walls.

Window Surround System

Four corner pieces can be selected without regard to right or left hand directions to complete a watertight window surround. The corner pieces receive J channel strips in the vertical and horizontal runs and when joined together in a window surround form a water guide that steers water around the corner free from directional constraints imposed during assembly as mandated by the prior art. Additionally, the corner pieces complete the surround assembly without the requirement of physically attaching the corner pieces per se to the base structure. Instead, the corners rely upon the J channel fastening devices to securely hold themselves in place in the window surround assembly.

Orientation Relative to Corner Piece

In order to meaningfully refer to a corner piece one must have a point of reference. FIG. 1 shows a top perspective taken from "outside" the corner piece, whereas FIG. 3 is a top perspective taken from the "inside" of the corner piece. Thus, the acute dimension of the corner is referred to as the inside, whereas the greater arc obtuse dimension is referred to as the "outside" of the corner piece. A V or L shape referred to herein is meant in the majority of cases to be a right angle with the open area within the V or L being the acute "inside" of the corner piece, and the remaining obtuse arc being the "outside" of the corner piece.

Description of Prior Art

Corner pieces for various arts are well known. For example corner pieces find extensive use in picture frames, exterior siding and many similar technical areas. This invention is by no means limited to the stated fields of use but may have broader application.

Typical of one field of use of this improved corner piece invention is the field of vinyl siding. U.S. Pat. No. 5,924,259 issued to Marousek on Jul. 20, 1999. The Marousek patent discloses a J channel system employing custom asymmetrical Left and Right corners. The present invention will likewise apply to vinyl siding but exhibits many advantages over this art.

The Marousek patent, at FIGS. 3 and 6, for example, has as its main focus individual right and left custom formed corner pieces when one is framing a window. Each individual corner piece has integrally formed right angle legs which are respectfully joined at an angle greater than ninety degrees. (See Marousek FIG. 2 and line 46.) Marousek corner 20 is shaped with dimensions adapted to receive within and then "lock" onto standard vinyl "facing" strips. See for example strips 52 and 56 which in units of four surround and finish off windows in homes.

Marousek FIG. 5 shows the right and left corner pieces together with four J channel strips for attachment together as a system 14 against wall 18 to form a surround around window 16. System 14 of Marousek intends to form such a channel by receiving an upper horizontal vinyl facing strip at the upper portion and side facing strip 28 on the opposing sides of 16. Please see FIGS. 6 and 7 which demonstrate the inserted and overlapped J channel attachments to the Left corner 10.

From an engineering standpoint the system of Marousek may form the desired water tight channel, but if so it does it only at a high cost of the precision required. Studied in light of today's construction boom, the Marousek system faces many drawbacks. Indeed, since some of his J channels must be cut to exact length and must be cut as square as possible, this prior art system approach suffers in many practical applications.

For example, the Marousek system requirements, especially on multi story building units requiring window surrounds, is highly impractical. Workers on ladders or scaffolding simply cannot take the time to measure with great precision and repeatedly go up and down for trial and error multiple vinyl J channel cuts. Even if the workers call out such precise requirements to those on the ground or lower levels, the square cuts of great precision are hard to achieve in a speedy and economical manner. The prior art Left and Right directionality causes both stocking and assembly problems. Other deficiencies will readily be recognized by those of skill in this art.

Rather than requiring such precision as mandated by Marousek and other known art, the present invention achieves water tight channel objectives in a simple and efficient manner. The invention is more economical, yet achieves the building requirements of perfect alignment and precision window surrounds. It does so by novel structure and improved methods of assembly and use.

The breakthrough for this invention was achieved by abandoning the custom Right and Left corner mentality of the prior art, and yet providing the advantages sought by such art. In my invention I provide a pair of side by side spaced apart corner angle pieces that are interleaved and looped together by a J channel receiving space. At the base of the angle pieces, both of my spaced and side by side corner angle pieces are also molded together. Moreover, this invention is supported and held in place by the J channel itself. It does not require exact length precision nor absolutely square end cuts. In short, improved construction techniques are provided by my invention.

In conclusion, what has not yet been provided, in order to fill a long sought for need, is a unitary molded corner piece that is free from right/left directional constraints which provides all necessary water guides. The new corner piece and the other novel improvements of this invention provide non obvious features well advanced over all of the known prior art.

DRAWING

FIG. 1 includes FIGS. 1A, 1B, 1C and 1D, wherein FIG. 1 is a top perspective view from outside of my right angle corner piece invention; FIG. 1A is a side view depicting one side of FIG. 1; FIG. 1B is a cross sectional view of the other side view; FIG. 1C is a top view looking down on FIG. 1; and FIG. 1D is a bottom view of FIG. 1;

FIG. 2 is a top view taken from above and showing an imaginary plane located on a diagonal and dividing the corner piece into two equal adjoined portions which form the angle under consideration;

FIG. 3 depicts an inside top perspective which reveals some exposed ends of the strengthening ribs in both adjoined portions of my corner piece invention;

Figure 4A:
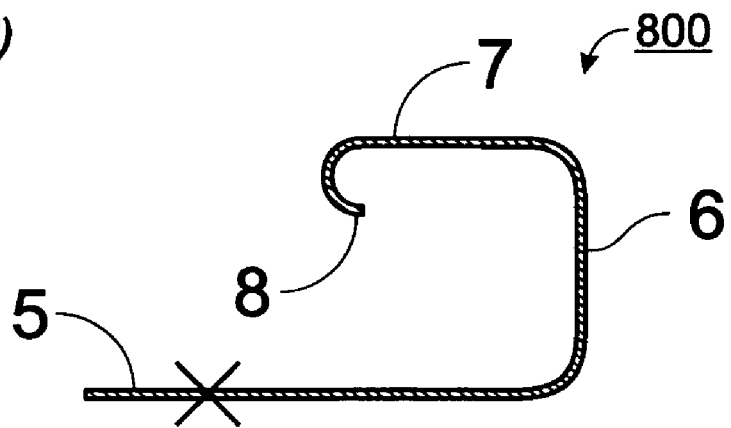
Figure 5:
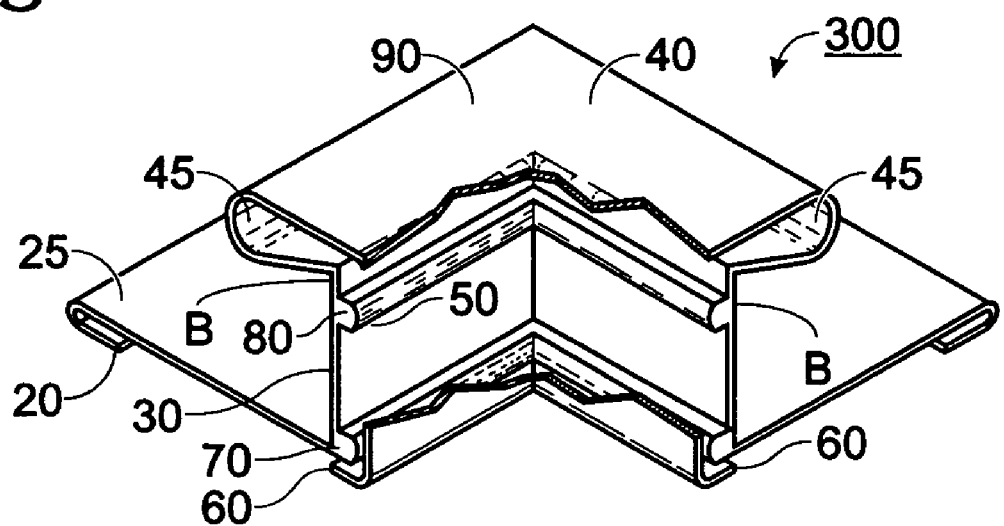

FIG. 4 is a top view including a pair of J channel pieces received within my corner piece invention. FIG. 4 also includes FIG. 4A which is an end view showing a cross section of a J channel and a fastening point designated by an X as a typical fastening means; and FIG. 5 is a cut away partial perspective view depicting the reinforcing ribs extending into and meeting at the inner apex of the angle of my corner piece.

SUMMARY OF THE INVENTION

My invention comprises a unitary molded corner piece shaped as a right angle with a grooved base having openings on adjacent sides of the base for receiving and joining together a pair of J channel pieces in a surround assembly. The corner piece invention has a raised upper flat surface of a given width which forms a right angle V (perhaps some may better think of it as an L) and a larger lower base surface which is also shaped as a larger and wider right angle V (or L) of the same orientation as the first V (or L). Grooves in the right angle base surface extend away from a diagonal line which divides the V or L into a pair of grooved legs for receiving the nailing flanges of J channel pieces joined together by the corner piece.

A cross section of the molded corner piece comprises a pair of separate spaced vertical walls that form an inner corner (A) and an outer corner (B). These corners are joined together by a molded horizontally oriented top piece in the cross sectional shape of a closed loop joining the top of an inner vertical wall to the top of an outer vertical wall, respectively defining the A and B corners. The joining loop is of a dimension adequate for receiving the curved free end portion of a J channel molding strip.

The inner right angle corner A is taller than the shorter outer right angle B, which inner angle includes an outwardly directed horizontally oriented upper surface of a given width which is slightly in excess of the top width of a J channel. This upper surface in cross section continues into a loop portion which curves back upon itself and joins with the top of the vertical wall of the outer right angle B. A pair of inwardly directed reinforcing ribs that also serve as water guides are located in the space between the vertical walls in order to direct water carried by the J channels around the corner piece per se.

Whereas the tops of the vertical walls are joined together by the closed adjoining loop, the base bottom of my spaced and side by side corners are also molded together at a connecting point located at the base intersection point of the proximate nailing channel sides of inserted J channel pieces to be joined. J channel molding strips have a horizontal nailing flange of a given width which, in cross section, turns by a radius into a vertical wall that turns again by radius into a horizontal top piece curved as a hook at the tip of its upper free end. It is this free hooked end of the J channel that fits within the joining loop of my corner piece invention.

The width of the J channel nailing flange fits within a pair of receiving grooves molded into the base of the corner piece such that two orthogonally oriented J channels slide into both of the adjacent receiving grooves in the base. The J channel vertical wall and its horizontal top also slide between the vertical walls and the joining loop of the corner piece. I refer to the space for receiving the J channel as a J channel pocket. Reinforcing ribs extend inwardly from the outer corner to provide a means for an initial "grab" of the J channels and to form a continuous water trough around the corner piece per se.

In short summary some of the features of my invention include the following:

Unitary molded corner piece for vinyl J-channel is made in all the standard sizes of J-channel that the industry produces.

A preformed PVC 90 degree corner designed to allow vinyl J channel to plug into either corner edge without the need for special cuts.

Molded one piece novel corner also minimizes installation time and eliminates water infiltration behind the corners.

Improved corner piece of the invention is expected to be used on windows and doors or anywhere two pieces of J-channel come together to form a given angle. That angle in the vast majority of situations is a 90 degree angle. The invention, however, is not so limited, as other angle degree amounts benefit from the advantages of this corner piece invention.

Novel use of a continuous loop connector portion joining a pair of spaced inner and outer vertical walls of two side by side corner angle pieces, one of which incorporates friction ridges that also act as water guides for carrying J channel water around a corner when the invention is placed in a window surround.

DETAILED DESCRIPTION OF THE PREFERRED EMBODIMENT

The invention will be described by reference to the several views hereof. Please collectively see FIGS. 1 through 5.

Figure 1:
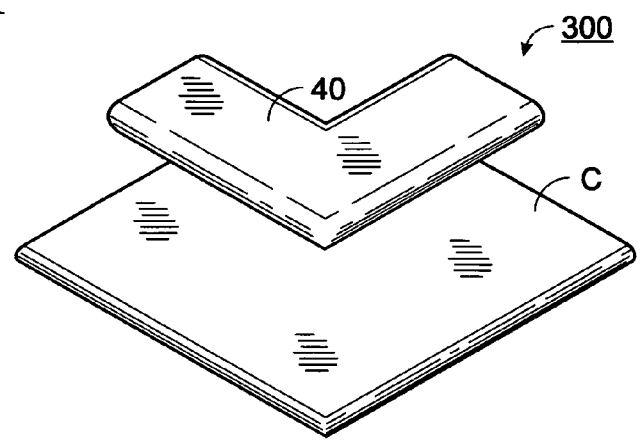

In particular, FIG. 1 shows a top perspective taken from outside the corner piece invention 300. Refer briefly to FIG. 1C, a top view looking down; area A is referred to herein as the "inside" of corner piece 300. Thus, the acute dimension of the corner 300 is referred to as the inside, whereas the greater arc obtuse dimension is referred to as the "outside" of the corner piece 300.

Figure 1A:
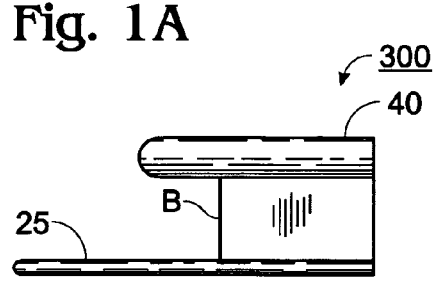
Figure 1B:
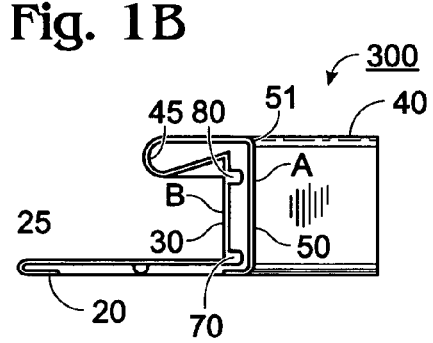
Figure 1C:
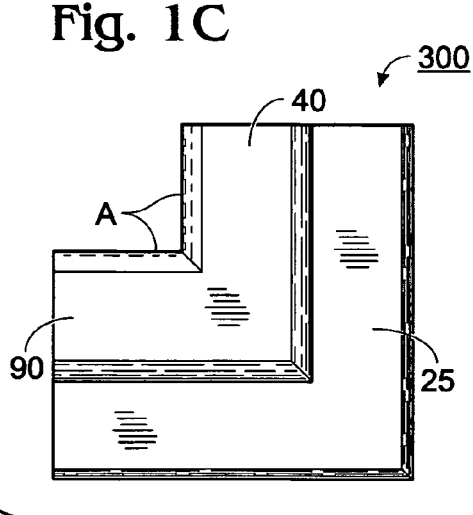
Figure 1D:
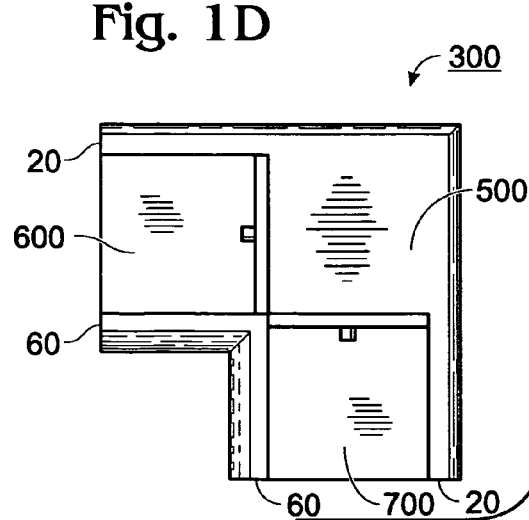

Digressing momentarily, FIG. 1A is a side view depicting one side of FIG. 1, and FIG. 1B is the other side of corner piece 300. FIG. 1D is a bottom view. These various views of FIG. 1 have walked around the corner piece 300 and have shown novel features that provide a versatility not found anywhere in the art, prior to the advent of this invention. Such features are described in more detail by reference to other figures of my invention as described further below.

The "outside" top perspective view of FIG. 1 should at this point be compared with an "inside" top perspective view of FIG. 3 showing exposed ends of a pair of receiving pockets for a pair of J channel strips. Both FIGS. 1 and 3 show the corner piece 300 of this invention as an integral and unitary molded device that has an inside (acute) right angle and an outside (obtuse) right angle shape.

Refer please to FIG. 3. Outer vertical wall B of FIG. 3 rides on a base 25 that is folded back on itself at 20, FIG. 3, to form one side of a groove in the base for receiving the inside edge of a nailing flange 5. See, FIG. 4A of a J channel. The bottom surface 500 of the base C is shown as FIG. 1D and has an adjacent pair of grooves 600, 700. The other radius side of a J channel nailing flange 5 is received within inwardly directed tab 60 that is formed in the base of the inner corner A. Tabs 20 and 60 are depicted in the bottom view of FIG. 1D. They together define a groove in base C, FIG. 1, for one J channel strip. Similarly tabs 20 and 60 in the other side of base C receive another adjacently located J channel strip. Grooves 600 and 700 have a depth into base C suitable for housing flange 5, FIG. 4A of a J channel 800.

FIG. 2 is a top view looking down on the corner piece 300. Because of the novel folded and overlapping structure of a serpentine-shaped flat plane that defines the corner piece 300 it will be described in cross section relative to an imaginary diagonal plane 200, FIG. 2. The vertical imaginary diagonal plane 200 equally divides the symmetrical corner structure into two parts 40 (right hand) and 90 (left hand). A demarcation indentation may run diagonally across the top surface between 40 and 90 and may thus visually separate the two top portions even though they form one molded continuous surface. Window surrounds normally have such a visible demarcation at that location.

Turning now briefly to FIG. 4, a top view looking down, a corner piece 300 is shown as it would appear in a typical window installation. Note that the two vinyl J channels D and E fit within the corner piece 300. Precise length or square end cuts on the J channel pieces are not required since they are both concealed within the J channel receiving pockets of corner piece 300. In FIG. 2, point 301 lies on the plane 200 and is defined as the outer "apex" point for corner piece 300. Point 302, on the other hand, is located at the inner "trough" of piece 300. The leg or portion 40 above diagonal 200 is referred to herein as the right hand leg 40 whereas the lower leg or portion 90 is referred to herein as the left or bottom portion.

FIG. 4A shows a cross section of a typical J channel 800. Each J channel has a horizontal nailing flange 5 of a given width. The X of FIG. 4A symbolizes a typical nail or tack for securing the flange 5 to a wall surface (not shown). Flange 5 has a radius that turns into a vertical wall 6 that turns again into a horizontal top piece 7 that is curved as an open J 8 at its free end. The J channel slips within an appropriately spaced pocket 45 formed by the inner and outer right angle sections of corner piece 300 as will be described in more detail with reference to FIGS. 3 and 4.

Corner 300, as shown in cross section in FIG. 3, is generally serpentine in shape with radius contours for each major directional change in the molded piece. Each vertical leg 50 of inner corner A includes a lipped tab 60 in base C. At the top of vertical wall 50 is a rounded radius 51. Radius 51 extends outwardly across the top surface 90 and into a closed loop 45 that returns back sharply at vertical wall 30 to form the outer angle B. The walls 30 and 50 are referred to herein as corner piece vertical walls, respectively, of inner and outer individual corners A and B. Wall 50 at the base is tabbed over by tab 60 that faces toward outer wall 30 and is spaced in depth there from in order to form part of a receiving groove for a nailing flange 5, FIG. 4A of a J channel 800.

Returning now to FIG. 3, corner A at the upper surface of FIG. 3 merges from a higher riser step, or wall, 50 into a slightly shorter outer corner "B" by way of an upper surface 40, 90 that forms part of a smooth rounded visible right angle loop 45. Each adjacent upper and lower legs of corner 300 comprises a pair of molded hollow right angle closed loops 45 (FIG. 3) returning from the generally pointed outer corner B (FIGS. 1 & 3) to the taller inner corner A of FIG. 3.

Outer right angle corner B is spaced slightly away from inner corner A (FIG. 3). Additionally, the outer corner B has a wider flange 25 lipped over at 20 for placement against a wall or support surface. Lips 60 and 20 are on the same base surface plane 500 (FIG. 1D) such that the entire corner piece 300 lays flush against a mounting surface (not shown).

The outer corner B includes inwardly directed reinforcing ridges 70, 80 for gripping the vinyl J channels D and E as shown in finished form in the top view of FIG. 4. Ridges 70 and 80 of FIG. 3 are located between the spaced upright walls 30 and 50. Such ridges from a trough for controlled water flow around corner piece 300 as described in detail hereinafter.

Loops 45, in turn, are essentially tear shaped in cross section such that when the ends of J channels D and E (FIG. 4) are inserted into the unitary integral corner piece 300 these ridges 70 and 80 together with closed loops 45 co-operate to "grab" the inserted J channels D and E (FIG. 4).

FIG. 5 is a cut away view in which the inner vertical wall 50 has been partially removed in order to show more detail of the strengthening ribs 70 and 80. Ribs 70 and 80 extend into the depth of the trough where they meet together.

Since the unitary corner piece 300 symmetrically receives end cuts D and E from individual strips of J channel, these strips can be slightly "off" lengthwise or imprecise from a squared end point of view, and yet visibly nothing shows as being imprecise when the corner system is formed into a finished window or door surround. The cooperative gripping of loops 45 and ridges 70 and 80 achieve a unitary frame system without requiring nails or other external holding devices other than the gripping devices securing J channels D and E. The improved corner piece 300, once assembled with two J channels may be securely held in place by the nailed J channels pieces themselves.

The novel features of the disclosed invention provide many unusual benefits. Achieved by this invention are some of the following features and benefits:

Highly practical assembly techniques.

A watertight guide for J channel molding.

Corner pieces held in place by J Channel molding strips themselves.

Water is collected by the J channel that slips within the corner piece loops that join the inner and outer angle walls.

While the prior art has a propensity to leave unsightly gaps and spaces during assembly, the invention virtually eliminates these problems which are caused by uneven or mis-measured lengths of J channel molding.

While my invention has been described with reference to particular examples of some preferred embodiments, it is my intention to cover all modifications and equivalents within the scope of the following claims. It is therefore requested that the following claims, which define my invention, be given a liberal interpretation commensurate with my contribution to the relevant technology.

What is claimed is:

1. In combination, J channel molding strips and corner pieces with said J channel molding strip having a flat nailing flange for placement on a wall as part of a wall window surround for receiving vinyl siding and said corner pieces each receive a pair of intersectionally oriented J channel molding strips which are connected by said corner piece to each other by insertion into matching molded pockets formed in said corner piece; said combination comprising:

said unitary molded corner piece having a pair of leg sections each having a flat base with a J channel nailing flange opening therein for placement against said wall and a pair of molded upwardly directed vertical risers extending away from said base in each of said leg sections;

a corner piece riser opening formed between said vertical risers with said riser opening directly leading into said opening in said base and said risers forming a hollow unitary angle by being molded into each other at an inner angle and an outer angle;

a pair of hollow horizontal loops of said corner piece located at right angles to each other and having a top exposed decorative surface in the shape of said angle with each one of said loops joining the top of the vertical riser of said inner angle of said corner piece to the top of the vertical riser of said outer angle of said corner piece; and said corner piece comprising, in cross sectional shape, a reverse C-shape pocket opening on one leg and a C-shaped pocket opening on the other leg with both pocket shapes being defined by said base opening which connects directly with said vertical riser opening which directly connects to said horizontal loop opening just below said decorative upper plane, which plane is parallel with the base, and said C and reverse C-shaped openings are molded into said corner piece for receiving a pair of J channel molding strips having cross sectional structure which mates with said C and reverse C-shaped openings.

2. The combination of claim 1 wherein each J channel molding strip inserted into the corner piece has a flat nailing flange with a J-shaped upright portion and said combination further comprises:

two separate J channels fitted into the J-shaped riser space between the double vertical risers of said corner piece;

means fastening the J channels by a fastening means into said J channel nailing strips and inserting same into the nailing flange opening in the base of said corner piece, which corner piece does not require an additional flange for nailing; and means holding the corner piece in a window surround by the J channel fastening means alone, since the corner piece relies upon the J channel fastening means to secure the corner piece to said wall.

3. A corner piece in accordance with claim 1 wherein said hollow double walled angle is further characterized as shaped in the form of a right angle V (or L) with the open area within the V (or L) being the acute "inside angle" of the corner piece, and the remaining obtuse arc outside of the V (or L) being the "outside angle" of the corner piece, and further comprising:

said pair of spaced vertical risers extending the full length of both of the leg sections forming said angle, which J-shaped space is sized to receive a corresponding vertical wall of a J channel that includes a top piece curved as an open J at its free end, which free end fits within said hollow loop when said window surround is assembled.

4. A corner piece in accordance with claim 3 wherein said corner piece has an upstanding vertical edge located at the apex of the acute angle formed by said pair of spaced vertical, and said corner piece further comprises:

horizontal reinforcing ribs molded into both legs of the outside angle of said corner piece, with said ribs running from front to back and molded together at said apex vertical edge.

5. The corner piece of claim 3 and further comprising:

the inside right angle being taller than the shorter outside right angle and said inside right angle includes an outwardly directed horizontally oriented upper surface forming an upper part of said hollow loop portion, which upper surface forms said visible decorative surface for said corner piece when same is installed in a window surround on a wall.

6. The corner piece of claim 5 wherein said corner piece further comprises:

said outer vertical riser includes a pair of inwardly directed reinforcing ribs, one rib near the top of the riser and one rib positioned at the base of said riser such that said ribs additionally serve as water guides to direct water around the corner piece per se.

7. A trim angle corner piece having a base, a top exposed decorative surface in the shape of said angle and a pair of legs for receiving J channel molding strips having a flat nailing flange for placement against a wall as part of a vinyl siding opening surround which includes at least a pair of intersectionally oriented J channel molding strips which are insertable into said corner piece; said corner piece characterized by comprising:

a pair of molded upwardly directed vertical risers in each of said leg sections with each riser having a top and said vertical risers extending away from J channel nailing flange openings in said base and molded into each other at a given inner angle which is spaced away from a given outer angle and forming a C shaped pocket in one leg and a reverse C shaped pocket in the other leg;

a pair of hollow horizontal loops of said corner piece located at said angle with each one of said loops joining the top of the vertical riser of said inner angle to the top of the vertical riser of said outer angle with said decorative surface molded into the top of said loops as a trim decorative surface; and said corner piece comprising, in cross sectional shape, a reverse C-shape pocket opening on one leg and a C-shaped pocket opening on the other leg with both pocket shapes being defined by said base opening which connects directly with said vertical riser opening which directly connects to said horizontal loop opening just below said decorative upper surface.

8. A corner piece in accordance with claim 7 wherein said corner piece has a first upstanding vertical edge located at the apex of the acute inner angle formed by the junction of said pair of spaced vertical risers, and a second upstanding vertical edge located at the apex of the obtuse outer angle formed by the junction of said pair of spaced vertical risers; said corner piece, in order to give said corner piece rigidity, further comprises:

molded material solidifying the bottom of said first vertical edge at said base and also together with the bottom of said second vertical edge of said outer angle.

9. A corner piece in accordance with claim 8 wherein said corner piece further comprises:

said hollow loops join and are molded together at the junction of the apex of said inner angle and are further molded together with the top of said first vertical edge.

10. A corner piece in accordance with claim 7 wherein said corner piece has an upstanding vertical edge located at the apex of the acute angle formed by said pair of spaced vertical risers, and said corner piece further comprises:

horizontal reinforcing ribs molded into both legs of the outside angle of said corner piece, with said ribs running in direction from front to back and joined together at said apex vertical edge.

11. The corner piece of claim 7 and further comprising:

the inside right angle being taller than the shorter outside right angle and said inside right angle includes an outwardly directed horizontally oriented upper surface forming an upper part of said hollow loop portion, which upper surface forms said visible decorative surface for said corner piece when same is installed in an opening surround on a wall.

12. The corner piece of claim 7 and further comprising:

said angle of said corner piece is a right angle: and said pair of intersectionally oriented J channel molding strips are orthogonally positioned relative to each other in said right angle corner piece.

\* \* \* \* \*